United States Patent [19]

Suzuki et al.

[11] 4,020,125

[45] Apr. 26, 1977

[54] THERMOSETTING RESIN

[75] Inventors: Hisao Suzuki, Fujisawa; Akira Musashi; Yoshiyuki Ando; Tomoyuki Inoue, all of Ichihara, all of Japan

[73] Assignee: Nippon Soda Company Limited, Tokyo, Japan

[22] Filed: Sept. 12, 1972

[21] Appl. No.: 288,374

[30] Foreign Application Priority Data

Sept. 14, 1971 Japan .............................. 46-70890

[52] U.S. Cl. ...................... 260/859 R; 260/37 N; 260/77.5 CR
[51] Int. Cl.$^2$ ........................................ C08L 75/00
[58] Field of Search .......................... 260/859, 77.5

[56] References Cited

UNITED STATES PATENTS

| | | | |
|---|---|---|---|
| 3,509,234 | 4/1970 | Burlant | 260/859 R |
| 3,607,976 | 9/1971 | Hsieh | 260/859 R |
| 3,616,193 | 10/1971 | Lubowitz | 260/859 R |
| 3,632,789 | 1/1972 | Wilhelm | 260/859 R |
| 3,635,891 | 1/1972 | Lubowitz | 260/859 R |
| 3,671,301 | 6/1972 | Dahl | 260/859 R |
| 3,678,014 | 7/1972 | Suzuki et al. | 260/859 R |
| 3,694,415 | 9/1972 | Honda | 260/859 R |

*Primary Examiner*—Paul Lieberman
*Attorney, Agent, or Firm*—George B. Oujevolk

[57] ABSTRACT

A resin comprising: (1) mainly a polybutadiene chain which is prepared from polybutadiene having a molecular weight of 500 to 200,000 and more than 30% of 1,2-configuration by hydrogenizing polybutadiene to the extent that at least about 30% of double bonds are contained in the polybutadiene molecule; (2) and olefinic bond group in the tip of the molecule; and, (3) a functional group selected from the group consisting of urethane, carboimino and ureylene which combine the polybutadiene chain and the olefinic bond.

4 Claims, No Drawings

THERMOSETTING RESIN

This invention relates to novel a curable resin and compositions thereof and more particularly is concerned with a novel curable resin characterized by having hydrogenized polybutadiene as a main chain, an olefinic bond in the tips of the molecule and urethane, carboimino or ureylene group which combines the polybutadiene chain with segments containing the olefinic bond. This invention also relates to the process for the production of the aforementioned resin.

It is well known that a linear polymer or copolymer of butadiene having a molecular weight of 500 – 20,000 is cured by heating together with an organic peroxide compound to produce a thermosetting resin, a coating film and an adhesive. However, in order to gain a sufficiently cured product, high temperature and a long period of time, for example 200° C or higher for from several hours to a day or longer are required. Thus, low an efficiency for baking apparatus, or difficulty of mass production, results in high cost for the cured product. In U.S. Pat. No. 3,083,175, Safford et al. describe how polybutadiene can be cured with di-α-cumyl peroxide within a short period of time. But the principal drawbacks are the physical properties of the product such as being poor in impact resistance, a crack resistance and an adhesion properties are yet not solved. Netherlands Patent No. 6,700,705 discloses (corresponding U.S. Pat. No. 3,431,235) that the reaction product between a polybutadiene having plural number of functional groups such as hydroxyl group and a chain extender such as organic diisocyanate compounds is cyclized by an organic peroxide compound and produces a hard or an elastomeric resin. Although this resin posses high strenght, chemical resistance and crack resistance, the thermal stability and curing rate are not always satisfactory.

For example, a curing period of time for several days at 150° C is necessary so that it is difficult to apply to sensitive electronic parts.

Further, some of the inventors discovered that polybutadiene having an olefinic bond in tips of the molecule can be cured in a short period of time at a low temperature (U.S. Pat. No. 3,678,014) and gives a resin having high strength, chemical resistance, crack resistance and good electrical property.

However, the polybutadiene resin has a defect that when curing is stopped in half-finished in order to give the resin a good flexibility, the obtained resin has an inferior electrical property, and a property to cure with the elapse of time and loses flexibility.

One of the objects of the present invention is to provide a resin which is capable of being cured at a relatively low temperature within a short period of time and having good flexibilty, mechanical strength and crack resistance.

Another object of the invention is to provide a casting material and an adhesive having the properties aforementioned. Another object is to provide a resin which can be cured without generating much calorific value which sometimes deteriorate inserted material and adherend. It is another object of the invention to provide processes for producing the resin, which is suitable for the thermosetting resin, the casting material and the adhesive aforesaid. It is another object to provide a resin which is not aged under high temperatures. A further object of the invention is to provide compositions which are suitable for casting resins, coatings or adhesives.

We have discovered that a resin having a hydrogenized polybutadiene chain, olefinic bond group in the tips of the molecule and urethane, carboimino, or ureylene group which combines the hydrogenized polybutadiene chain with the segments containing olefinic bond can be cured in the presence of an organic peroxide compound at a relatively low temperature within a very short period of time, and the cured resin has good flexibility, mechanical strength and crack resistance.

The resin is comprised of (1) mainly a polybutadiene chain which is prepared from polybutadiene having molecular weight of 500 to 20,000 and more than 30%, preferably 85% to 100% of 1,2-configuration by hydrogenizing polybutadiene to the extent that at least about 30% preferably more than about 50% to about 95% of double bonds contained in the polybutadiene molecule, (2) olefinic bond group in the tip of the molecule and (3) functional group selected from the group of urethane, carboimino and ureylene group which combine the polybutadiene chain and the olefinic bond.

The resin can be prepared by reacting

A. hydrogenized polybutadiene having at least one active hydrogen which is reactive to isocyanate group, which is prepared by hydrogenizing polybutadiene having at least one, preferably two active hydrogen, 500 – 20,000 molecular weight and more than 30% preferably 85% to about 100% of 1,2-configuration, to the extent of at least 30%, preferably more than about 50% to about 95% of double bonds containing in the polybutadiene molecule, and B. isocyanate compound having at least one isocyanate group and an olefinic bond group.

The reaction for the preparation of the resin of the present invention is carried out by mixing the hydrogenized polybutadiene and the isocyanate compound at an elevated temperature not higher than 150° C, preferably at a temperature from 50° C to 100° C, for about 0.5 to 10 hours, in the presence of a promoter and diluent if desired. The quantity of the isocyanate compound is settled such that the ratio of the isocyanate group to the active hydrogen component of the functional group of the hydrogenized polybutadiene is not less than 0.5 and preferably from 0.8 to 1.2. When the ratio is less than 0.5, the resulting product fails to attain the expected object of this invention because of insufficient introduction of the urethane and olefinic bond group and, on the other hand, when the ratio is much too high, the resulting product contains a free isocyanate group and it tends to increase viscosity or to solidify by reacting with moisture. The diluent employed in the reaction is selected from organic solvents, being inert to the isocyanate group, such as benzene, toluene, xylene, hexane, chlorobenzene, carbon tetrachloride, chloroform, trichloroethylene, tetrachloroethylene, etc. and catalysts used for the urethane reaction, for example tertiary amines or organic tins, are applied as the reaction promoter.

In order to obtain the hydrogenized polybutadiene in the invention, hydrogenation can be carried out in the usual way by reacting hydrogen with about 100 parts of the polybutadiene in the presence of about 0.5 to 10 parts preferably 1 to 5 parts of hydrogenation catalyst as ordinarily used, for example, Ni, Pt and Pd, at atmospheric pressure to about 100 kg/cm$^2$ for several hours to few days. When stabilized nickel or Raney nickel catalyst is employed, the hydrogenation can be carried at a temperature of 130° C to 180° C at atmosphere pressure to 10 kg/cm² for 10 to 30 hours. Xylene or kerosine is preferably employed as a diluent.

The proportional of the hydrogenation of hydrogenated double bonds based on total double bond contained in the raw polybutadiene should be more than 30%, preferably more than 50% to 95%. When the proportion is more than 97%, the finished resin becomes difficult to be cured in short period of time and when the proportion is less than 30%, the resin can not have intended properties, especially, an property of good flexibility.

In general, butadiene can enter into a polymer chain by either 1,2- or 1,4-mode of addition; the 1,2-mode of addition results in the following "pendant vinyl" structure

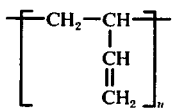

(herein called "1,2-configuration") whereas 1,4-mode of addition results in the following structure:

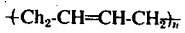

(herein called "1,4-configuration"). A mode of addition depends on the type of catalysts and conditions used for the polymerization. It is necessary in this invention, as the raw polybutadiene to be hydrogenized, to use polybutadiene having a higher content of the 1,2-configuration structure; i.e., at least 30%, preferably over 50% and more preferably over 85% to about 100%. And the polybutadiene chain may contain other kinds of comonomer residues not more than 50 weight % of the total polymer. Such copolybutadiene is also involved polybutadiene herein. Comonomers which can be used for producing copolybutadiene are styrene, α-methyl styrene, isoprene, methyl acrylate, ethylacrylate, methyl methacrylate and ethyl methacrylate and they are employed with butadiene as random, block or graft copolymer.

The polybutadiene used for the present invention as the raw polybutadiene to by hydrized is also required to have substantially two active hydrogens which react with isocyanate radical and such active hydrogen is introduced with a electrophilic functional groups such as hydroxyl, carboxyl, amino and mercapt. These polybutadiene is produced by the conventional processes using such catalyst system as an alkali metal catalyst in the non-polar hyrocarbon solvent, an alkyl, aryl or aralkyl lithium catalyst in the non-polar hydrocarbon solvent, a coordinated anionic catalyst, and an alkali metal catalyst in the lewis base solvent. The alkali metals used are lithium, sodium, potassium, rubidium and cesium; the alkyl, aryl or aralkyl lithium catalyst is, for example, ethyl, propyl, butyl, amyl, phenyl or cumyl lithium; and typical examples of the coordinated anionic catalysts are triethylaluminium - triacetylaceto vanadium, triethylaluminiumtriacetylaceto chromium and triethyl alminiumtetrabutyl titanium. However, favorable polybutadiene are, for instance, produced as follows; in the presence of an aromatic hydrocarbon activator such as naphthalene or 1,2-diphenylbenzene, butadiene or a mixture of butadiene and diluent is introduced into a Lewis base which contains a dispersed alkali metal such as lithium, sodium potassium, rubidium or cesium and polymerized under chilling below −30° C and agitation. Mixing the resulting reaction mixture with an electrophilic agent such as carbon dioxide, alkylene oxide having less than 5 carbon atoms or ethylene sulfide followed by treating with proton-donor reagent such as water, alcohols or carboxylic acids, polybutadiene having the electrophilic functional groups having active hydrogen substantially on both sides of the polymer chain is obtained. If butadiene and any of the comonomer aforementioned are added simultaneously, alternatively or successively into the Lewis base containing dispersed alkali metal, and the resulting reaction mixture is treated with electrophilic reagent and proton-donor reagent, copolybutadiene having the functional groups is given. This polymerization reaction can also be carried out in the absence of the aromatic hydrocarbon activator when the dispersed alkali metal is such enough fine as the average diameter is less than 5. The aromatic hydrocarbon activator used for this reaction is condensed ring aromatic hydrocarbons such as anthracene, naphthalene and phenanthrene; non-condensed ring aromatic hydrocarbons such as biphenyls and terphenyls; polynuclear condensed ring aromatic compounds such as binaphthyls and phenyl naphthalene; conjugated unsaturated hetero cylcic compound substituted with a vinyl group such as α-vinyl pyridine and vinyl furan; or diaryl ketone such as benzophenone and phenyl naphthyl ketone. The Lewis base used for this reaction is ethers such as dimethyl ether, methyl ethyl ether, 1,2-dimethoxy ethane, 2,2'-dimethoxy dimethyl ether, tetrahydro furan and 1,4-dioxane; acetals such as methylal and 1,1-dimethoxy ethane; and tertiary amines such as trimethyl amine, triethylamine and N-methyl morpholine. Thus, the polybutadiene obtained by the above procedure has more than 80% of 1,2-configuration, extremely narrow distribution of molecular weight of $\overline{M}w/\overline{M}n$ of 1.0 to 1.5 and substantially a functional group on each end of polymer chain, and consequently it is particularly favorable for a raw material of the present invention.

A polybutadiene having the functional groups is also derived from polybutadiene not having functional group by reacting with an active monomer containing at least one function group. Acrylic acid, methacrylic acid, maleic acid, maleic anhydride, fumaric acid and esters thereof are examples used for the active monomer. Reaction between the polybutadiene and the active monomer takes place by mixing together and keeping at an elevated temperature with agitation in the presence of a catalyst, a gelling inhibitor and diluent if desired. During the reaction period, the active monomer seems to add on the α-position carbon of unsaturated c-c bond of the polybutadiene and thus the functional group is introduced. In general, molar ratio of an active monomer to the polybutadiene should be controlled not to be over 2.

When the polybutadiene having molecular weight less than 200 is employed in the invention, a finished adhesives has infarior electric insulation resistance, heat resisting property, water resisting property and chemical resistance and when the polybutadiene having more that 20,000 of molecular weight, the viscosity of the resin becomes high and working property becomes bad. Further when the polybutadiene having less than 30% is employed, a reaction rate of the hydrogenation becomes low and the reaction becomes high cost because the reaction has to be carried out under very high temperature and pressure for a long time.

Typical isocyanate compounds having an olefinic bond group include: allyl isocyanate, methallyl isocyanate, butenyl isocyanate, 2-butene-1,4-diisocyanate, 2-methyl-2-butene-1,4-diisocyanate, trans-vinylene diisocyanate, vinyl phenyl isocyanate, vinyl phenyl diisocyanate, vinyl toluylene isocyanate and vinyl isocyanate.

Other and preferable isocyanate compounds having an olefinic bond group are prepared by the reaction between an olefinic compound having at least one function group which contains an active hydrogen atom such as hydroxyl, amino or carboxyl group, and polyisocyanate compounds.

Typical examples of the olefinic compounds which may be employed in the above reaction are: olefinic alcohols, e.g. allyl alcohol, methallyl alcohol, cinnamyl alcohol, butenyl alcohol and vinyl benzyl alcohol; phenols, e.g. vinyl phenol; olefinic acids, e.g. acrylic acid, methacrylic acid, $\beta$-chloroacrylic acid, $\beta$-bromoacrylic acid, cinnamic acid, crotonic acids, monoalkyl maleate, $\alpha$-chloro-monoalkyl maleate, mono alkyl fumarate and p-vinyl benzoic acid; olefinic amides, e.g. acryl amide, methacryl amide and maleic amide; amines, e.g. 2-aminoethyl vinyl ether, allyl amine, and amino styrene; hydroxyalkyl acrylates, e.g. 2-hydroxyethyl acrylate, 2-hydroxypropyl acrylate, 2-hydroxybutyl acrylate, $\omega$-hydroxybutyl acrylate and p-hydroxyphenyl acrylate; hydroxyalkyl methacrylates, e.g. 2-hydroxyethyl methacrylate, 2-hydroxypropyl methacrylate, 2-hydroxybutyl methacrylate, $\omega$-hydroxybutyl methacrylate and p-hydroxyphenyl methacrylate, 2-carboxypropyl methacrylate; amino alkyl acryl amides, e.g. 2-amino ethyl acryl amide and 2-amino propyl acrylamide; and aminoalkyl methacryl amides, e.g. 2-aminoethyl methacryl amide and 2-aminopropyl methacryl amide. Among these olefinic compounds, hydroxyalkyl acrylates hydroxyalkyl methacrylates acrylic acid and methacrylic acid are particularly favorable because the olefinic bond group, which is close to electrophilic group and has a moderate distance from urethane bond, is extremely activated and consequently it is possible to cure the resultant resin within a short period of time at relatively low temperature.

Suitable polyisocyanate compounds which may be employed to the reaction with the above olefinic compounds include the following: aliphatic polyisocyanates, e.g. hexamethylene diisocyanate, pentamethylene diisocyanate, butylene diisocyanate, propylene diisocyanate and ethylidene diisocyanate: aromatic polyisocyanate, e.g. 2,4-toluylene diisocyanate, 2,6-toluylene diisocyanate, 1,4-benzene diisocyanate, diphenylmethane-4,4'-diisocyanate, 2,2'-diphenylpropane-4,4'-diisocyanate, 3,8'-dimethyldiphenylmethan-4,4'-diisocyanate, 1-chlorobenzene-2,4-diisocyanate, dimethylbenzene diisocyanate, p- or m-phenylene diisocyanate, naphthylene diisocyanate, triphenylmethane triisocyanate, pyrene diisocyanate and xylene diisocyanate nitrodiphenyldiisocyanate, 1-methylbenzene-4,4,6-triisocyanate,; and alicyclic polyisocyanates, e.g. cyclopentylene diisocyanate and cyclohexylene diisocyanate. These polyisocyanate compounds must be employed in an excess quantity for stoichiometrically amount and, in the other words, the reaction is carried out so as to maintain a ratio of the polyisocyanate group to olefinic compound is not less than 1.1 and favourably between 1.5 and 2.5 and the action can be completed at less than 150° C preferably 50° C to 100° C for 0.5 to 6 hours.

The resin of the present invention is also prepared by another process in which the said olefinic compound reacts with the isocyanate prepolymer which is obtained by the reaction between the polybutadiene having active hydrogens and an excess quantity for stoichiometrical amount of polyisocyanate compound. In this case, a ratio of a isocyanate group of polyisocyanate compound to active hydrogens of functional group of hydrogenized polybutadiene is settled to more than 1.1 and favorably 1.6 – 2.4 and the ratio os isocyanate group in the isocyanate prepolymer to active hydrogen of functional group of olefinic compound is not less than 0.5 to less than 1.2.

When the ratio of isocyanate group of polyisocyanate compound to active hydrogens of polybutadiene is settled to about 2, polybutadiene having isocyanate on each of the polymeric chain is obtained and the ratio is lower than 2, chain extention takes place and urethane prepolymer having isocyanate group is obtained. One of merits of this process is that a relatively low molecular weight polybutadiene may be applicable. If the ratio aforementioned is lower than 2, a chain extension reaction takes place and the resulting resin is rich in urethane group.

The resin of the present invention can be used as a element of a composition for thermosetting resin and the composition can be cured at 60° – 200° C, preferably 80° – 150° C for 5 minutes to several hours for the formation of the composition olefinic monomer, curing promoter, filler, other resin and other additives can be optionally employed.

Further more the resin can be also prepared by mixing hydrogenized polybutadiene, polyisocyanate compound and olefinic compound and in this case, at first hydrogenized polybutadiene and polyisocyanate were mixed well and then isocyanate compound should be added slowly preferably dropwise.

A typical composition for the thermosetting resin having use for moulding, such as potting, casting, sleet moulding, bulk moulding comprises 20 – 98% of the resin, preferably 10 – 70%, 0 – 70% of olefinic conomer, 0.1 – 10% of an organic peroxide compound, 0,001 – 1% of a curing promoter and balance of other kind of thermosetting resin and filler if desired. The resin used for the thermosetting resin composition is made of polybutadiene having an average number molecular weight of 200 to 20,000, preferably 500 to 5,000 and favorably more than 80% of 1,2-configuration. The resin derived from the above polybutadiene and hydroxyalkyl acrylate or hydroxyalkyl methacrylate, is curable at relatively lower temperature within a short period of time such as 120° C, 10 minutes or 150° C, 5 minutes and therefore it is particularly favorable among the resin of the invention and can be cured by electron beam radiation.

Olefinic monomer which may be employed to the thermosetting resin composition include styrene, $\alpha$-methylstyrene, vinyl toluene, propylacrylate, ethylacrylate, methylacrylate, propyl methacrylate, ethyl methacrylate, methyl methacrylate, diethyl fumarate, dimethyl fumarate, diethyl maleate, dimethyl maleate and diallyl phthalate and they are selected depending on an usage of a cured resin. For examples, if mechanical strength is required, aromatic vinyl compounds, acrylates or methacrylates are employed, if electrical properties are important, aromatic vinyl compounds of dially phthalate are employed and if rapid curing is necessary, acrylic acids, methacrylic acid, acrylates or methacrylates are used.

Organic peroxide compounds which may be employed to the thermosetting resin composition include: diacyl peroxides, e.g. benzoyl peroxide, 2,4-dichlorobenzoyl peroxide, octanoyl peroxide, lauloyl peroxide; alkyl peresters, e.g. tert-butyl perbenzoate, tert-butyl peracetate, di-tert-butyl perphthalate, 2,5-dimethyl-2,5-di(benzoyl peroxy)hexane; ketone peroxide, e.g. methyl ethyl ketone peroxide, cyclohexanone peroxide; and hydroperoxides, e.g. tert-butyl hydroperoxide, cumen hydroperoxide, $\alpha$-phenyl ethyl hydroperoxide, cyclohexenyl hydroperoxide.

Curing promoters of this composition include metal salts of octyl acid, stearic acid, oleic acid, linoleic acid, naphthenic acid and rosin acid and said metal is selected from the group consisting or chromium, iron, cobalt, nickel, manganese and lead, and typical fillers are powder or particles of polyethylene, polybutadiene rubber, wooden dust, cellulose, plasticizer, talc, kaoline, asbest, silica, glass fiber and calcium carbonate.

Furthermore, as one of the embodiments of this invention, unless it is contrary to the expected object, other polymer may be added to the thermosetting resin composition and one of examples of the other polymer is unsaturated polyester or alkyd resin.

Furthermore silane coupling reagent of 0.01 to 5% and antioxidant of 0.01 to 5% may be employed and as a typical silane coupling agent, alkoxy silane such as 6-methacryloxypropyltrimethoxysilane, vinyltriethoxysilane, vinyltris($\beta$-methoxyethoxy)silane, $\beta$-(3,4-epoxycyclohexyl)ethyltrimethoxysilane, 6-glycydoxypropyltrimethoxysilane, 6-aminopropyltrimethoxysilane, N-$\beta$-(aminoethyl)$\alpha$-aminopropyltrimethoxysilane, $\alpha$-chloropropyltrimethoxysilane, $\alpha$-chloroisobutyltriethoxysilane, $\beta$-cyclohexylethyltriethoxysilane, phenyltriethoxysilane, amyltrimethoxysilane can be employed and as a typical Antioxidant, higher alcohol ester such as dilaurylthiodipropyonate, distearylthiodipropionate, laurylstearylthiodipropionate, laurylstearylthiodipropionate and alkylphenols such as 4,4-thio-bis(6-tert-butyl-3-methylphenyl), 3,5-di-tert-butylhydroxytoluene, 2,2'-methylene-bis(4-methyl-6-tert-butylphenol) can be employed. In the invention double bonds are reduced and hydrogenized polybutadiene main chain has very few double bond in the chain, therefore the resin has improvement in electrical property and fine flexibility without aging.

Various kinds of goods can be produced by the resin of our invention, for example, the resin is preferably used by casting or moulding in such electric parts as condenser, cable splicer resistance, transistor, rectifier such as high-tention silicon diode or selenium rectifier moter, transformer, such as flyback transformer, generator, insulator, swichgear, breaker, socket, plug socket, such chemical apparatus as cock, valve, piping joint, pump, such structural parts of car and bicycles as casings, distributor, caps, brake, clutch and such miscellaneous goods as pellete of container, tableware, title, synthetic marble. Prepregs can be made by the resin of our invention and the resin can be employed in such laminates as electric parts, e.g. insulator of fiber reinfoced plastic pipe, board of print circuit, tray for microwave oven, radar dome, parts for microwave, chemical apparatus, e.g. reactor vessel and other miscellaneous, e.g. corrugated fiber reinforced plastic board, pallete for container, bath tub, cover of electrolytic cell.

A composition for the adhesive of the present invention comprises 20 – 90% of the resin 10 – 20% of a vinyl compound, 0.1 – 10% of an organic peroxide compound, 0.001 – 1% of curing promoter, an adequate quantity of silan coupling agent, filler and solvent if necessary, and is available for bonding of wood, metals, glass, rubber and plastics. The resin used for the adhesive is prepared from the polybutadiene having an average molecular weight of 1,000 to 20,000, favorably 2,000 to 10,000, and an organic peroxide compound, a curing promoter and a filler which are described in the thermosetting resin composition and solvent are all applicable to the adhesive. Organic solvent which may be employed to the adhesive include aliphatic hydrocarbons, e.g. naphtha, kerosene and mineral spirits; aromatic hydrocarbons, e.g. benzene, toluene, xylene and solvesso; alcohols, e.g. butanol, propanol and methyl isobutyl carbinol; esters, e.g. ethyl acetate and butyl acetate; ketones, e.g. methyl ethyl keton, methyl isobutyl ketone and cyclohexanone; ethers, e.g. ethyleneglycol ethyl ether and ethyleneglycol butyl ether; and hydrocarbon halogenides, e.g. carbon tetrachloride, trichloroethylene, monochlorobenzene and tetra chloroethylene.

For the presence of olefinic bond group joined through urethane, carboimino or ureylene group in the resin, cross-linking reaction takes place very rapidly, at a low temperature and the adhesive of the present invention cures quickly, has toughness and excellent adhesive properties.

Then the effects of the present invention will be shown in the following Examples. All quantities described in this specification and the appended claims as "parts" or "percent" refer to "parts by weight" or "percent by weight" unless expressly stated otherwise.

EXAMPLE 1

Butadiene was added into tetrahydrofuran containing a dispersed metallic sodium and 1,2-diphenyl benzene at −75° C, and polymerized under vigorous agitation. The reaction mixture was treated with ethylene oxide and then hydrolyzed, and thus polybutadienediol [A-1] having a number average weight 1,350, hydroxyl value of 77.3, 92.3% of 1,2-configuration, 7.7% of trance-1,4-configuration and a viscosity of 8,000 centipoise at 45° C was obtained.

Then, the polybutadienediol [A-1] was hydrogenized by adding hydrogen gas in a reactor at 0.8 litre/minute for 15 hours at a temperature of 170° C in the presence of catalysis of 3.0% of stabilized nickel and 0.2% of di-tert-butylhydroxyltoluene and after refining of the reaction product, hydrogenized polybutadienediol [B-1] having 49 of iodine number, 67.7 of hydroxyl value and 88.5% of hyprogenation rate was obtained.

On the other hand, an isocyanate compound having at least one isocyanate group and an olefinic group was prepared by reacting 260 parts of 2-hydroxyethylmethacrylate and 348 parts of commercial toluylenediisocyanate composed of 80% of 2,4-toluylenediisocyanate and 20% of 2,6-toluylenediisocyanate at room temperature for 2 hours under agitation, then for 3 hours at 80° C, and thereby 608 parts of isocyanate compound having olefinic bond group [C-1] was prepared.

Then, 1,652 parts of the hydrogenized polybutadienediol [B-1] and 608 parts of the isocyanate compound [C-1] were mixed and heated at 80° C for 4 hours under agitation and 2,260 parts of the resin [D-1] were obtained.

The resin was viscous, oily and according to the result of the determinations of infrared spectrum absorption, it was believed that all most all isocyanate group were reacted and the formula was as follows.

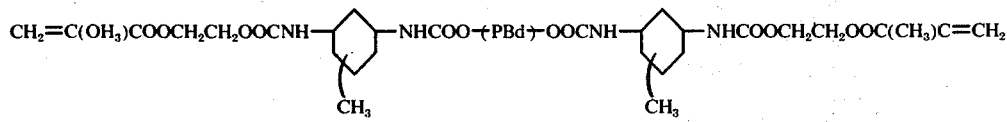

The resin [D] was used for the following test. PBd is a main chain of hydrogenized polybutadiene.

EXAMPLE 2

Polybutadienediol [A-2] having a number average molecular weight of 2,160, hydroxyl value of 43.6, 93.3% of 1,2-configuration, 6.7% of trance-1,4-configuration and a viscosity of 19,500 centipoise at 45° C was prepared according to the similar process as discribed in Example 1. Then hydrogenized polybutadienediol [B-2] having 32 of iodine number, 39.0 of hydroxyl value and 90.2% of hydrogenation rate was obtained according to example 1.

On the other hand, 166 parts of allyl alcohol was allowed to react with 500 parts of 4,4'-diphenylmethandiisocyanate for 3 hours at 60° C and 616 parts of isocyanate compound having olefinic bond [C-2] was obtained.

Then 2,878 parts of hydrogenized polybutadienediol [B-2] and 616 parts of the siocyanate compound [C-2] were mixed and heated at 60° C for 4 hours under agitation, and 3,494 parts of the resin [D-2] of viscous liquid was obtained. It was believed that the resin has following chemical formula:

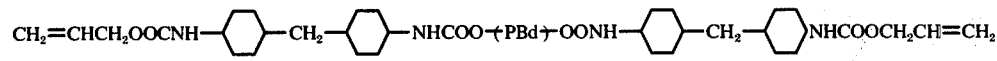

EXAMPLE 3

Polybutadienediol [A-3] having a number average molecular weight of 1,930, hydroxyl value of 46.7, 92.6% of 1,2-configuration, 7.4% of trance-1,4-configuration and a viscosity of 19,800 centipoise at 45° C was prepared according to the similar process as discribed in Example 1.

Then, hydrogenized polybutadienediol [B-3] having 41 of iodine number, 41.4 of hydroxyl value and 90.0% of hydrogenation rate was obtained according to example 1.

On the other hand, 230 parts of 2-hydroxyethylacrylate and 348 parts of commercial toluylene-diisocyanate shown in example 1 were reacted at room temperature for 2 hours, then at 80° C for 3 hours, and thereby 578 parts of isocyanate compound having olefinic bond group [C-3] was prepared.

Then, 2710 parts of the hydrogenized polybutadienediol [B-3] and 578 parts of the isocyanate compound [C-1] were mixed and heated at 80° C for 4 hours under agitation and 3,188 parts of the resin [D-3] of viscous liquid was obtained.

EXAMPLE 4

Butadiene was added into tetrahydrofuran containing a diopersed metallic sodium and 1,2-diphenyl benzene as an activator at −75° C and was polymerized under vigorous agitation. The reaction mixture was treated with carbon dioxide (dry ice) followed by hydrolysis and separation process, and thus polybutadiene dicarboxylic acid [A-4] having a number average molecular weight of 1,490, 60.5 of acid value, 27,000 centifoise of viscosity at 45° C, 90.7% of 1,2-configuration, 9.3% of trance-1,4-configuration was obtained. Hydrogenized polybutadienediol [B-4] having 84 of iodine number, acid number of 57.7 and 79% of hydrogenation rate was obtained according to example 1. Further 230 parts of hydroxyethylacrylate and 500 parts of 4,4'-diphenylmethandiisocyanate were mixed at 50° C for 1 hour and further at 60° C for 2 hours and isocyanate compound having olefinic bond [C-4] was obtained.

Then, 2,045 parts of hydrogenized polybutadienediol [B-4] and 730 parts of isocyanate compound [C-4] were mixed at 80° C and the reaction was completed to the extent that carbondioride gas was not generated and 2,687 parts of the resin [D-4] of viscous liquid was obtained.

EXAMPLE 5

An isocyanate compound having olefinic bond [C-5] was obtained by reacting 348 parts of 2,4-toluylenediisocyanate with 172 parts of mathacrylic acid at room temperature for 3 hours, then 30° C for 3 hours.

Then, 2,710 parts of hydrogenized polybutadienediol [B-3] and isocyanate compound [C-3] were mixed at 80° C for 4 hours under agitation and 3,186 parts of the resin [D-5] was obtained.

COMPARATIVE EXAMPLE 1

1,680 parts of polybutadienediol [A-6] having molecular average weight of 1,380, hydroxyl value of 66.7 92,9% of 1,2-configuration, 7.1% of trance-1,4-configuration and viscosity of 7,800 centipoise at 45° C was reacted with 608 parts of isocyanate compound having olefinic bond [C-1] at 80° C for 4 hours, and 2,288 parts of polybutadiene resin [D'-1] was obtained.

TEST 1

The resins [D-1,2,3,4,5] obtained in examples were used for formation of thermosetting resin composition by adding curing agent and vinyl monomer and the composition was cured after deairing under reduced pressure. Further properties of cured resin obtained were measured and the results were shown in table 1.

Table 1

| Run | | 1 | 2 | 3 | 4 | 5 | 6 | 7 | comparative 1 | comparative 2 |
|---|---|---|---|---|---|---|---|---|---|---|
| resins | resins | D-1 100 | D-1 80 | D-2 100 | D-2 80 | D-3 100 | D-4 100 | D-5 100 | D'-1 100 | D'-1 100 |
| (parts) composition | vinyl monomer | — | tert-butyl-styrene 20 | — | methylmetha-crylate 20 | — | — | — | — | — |
| | curing agent** | percumyl D 5.0 | percumyl D 3.0 percumyl Z 2.0 | percumyl D 5.0 | percumyl D 3.0 perbutyl Z 2.0 | percumyl D 5.0 | percumyl D 5.0 | percumyl D 5.0 | percumyl D 2.0 | D 0.05 |
| curing condition | | 90° C × 1 hr. + 100° C × 1 hr. + 110° C × 1 hr. + 115° C × 3 hr. + 120° C × 1 hr. | | | | | | | | |
| hardness (shore D) | | 36 | 36 | 30 | 39 | 35 | 34 | 35 | 69 | 36 |
| volume contraction (%) | | 2.8 | 2.4 | 3.2 | 3.8 | 3.5 | 2.5 | 3.6 | 5.4 | 3.7 |
| thermal resistance 180° C × 100 hrs. test | shore D φ32mm*** washer | 38 o | 39 o | 35 o | 43 o | 39 o | 37 o | 40 o | 80 △ | 55 x |
| temperature rising (150° C)***** | | 1 | 15 | 0 | 28 | 0 | 0 | 2 | 158* | 0 | note
*basic temp. : 120° C
**percumyl D — dicumylperoxide, perbutyl Z — tert-Butylperbenzoate
***washer test: C style washer having 32mm diameter was inserted in a 10mm×40mm block by casting the resin and cracks were surveyed and estimated by following grading.
    o:no crack △:a few cracks x:many cracks
*****Test method: 15 gas of the composition in a tube having 18mm of diameter was heated in hot stove at basictemperature of 150° C and temperature arising from 150° C to highest temperature was measured:

TEST 2

The resin [D-3] prepared in Example 3 was cured for formation of thermosetting resin composition by adding curing agent and vinyl monomer and the composition was cured after dearing under reduced pressure. Further properties of cured resin obtained were measured and the results were shown in Table 2. Further more electric properties were measured in Table 3.

Table 2

| run | | 8 | comparative 3 |
|---|---|---|---|
| resin | resin | [D-3] | [D'-1] |
| composition | (parts) | 100 parts | 100 parts |
| | curing agent | percumyl D 5 parts | percumyl D 0.05 part |
| curing condition | | 150° C × 4 hrs. | 150° C × 4 hrs. |
| shore D hardness | | 35 | 37 | adhesive prepared by comparative resin [D'-1] in adhesive strength and flexibility.

Table 4

| run | | 9 | comparative 4 |
|---|---|---|---|
| resin | resin (parts) | D-1 100 | D'-1 100 |
| composition | silane coupling agent (parts)* | 5 | 5 |
| | percumyl D (parts) | 5 | 1 |
| curing condition | | 160° C × 1 hrs. | 160° C × 1 hrs. |
| crosscut adhesion (Kg/cm)** | room temperature at 150° C | 1.5 | 1.6 |
| | after 10 days | 1.4 | 1.0 |
| after the heating of 10 days at 150° C | appearance flexibility | slightly yellow fine | yellow crack bad |

Note
*vinyl-tri-ethoxysilane
**JIS(Japanese industrial standards)-C-6481

Table 3

| resin | | [D-3] | | | | comparative 3 [D'-1] | | | |
|---|---|---|---|---|---|---|---|---|---|
| | cycle(HZ) | 60 | 1K | 100K | 1M | 60 | 1K | 100K | 1M |
| | temperature | | | | | | | | |
| tan δ | 24 | 0.0010 | 0.0010 | 0.0040 | 0.0060 | 0.010 | 0.008 | 0.005 | 0.007 |
| | 65 | 0.0010 | 0.0007 | 0.0020 | 0.0048 | 0.012 | 0.014 | 0.012 | 0.012 |
| | 100 | 0.0005 | 0.0006 | 0.0013 | 0.0040 | 0.008 | 0.013 | 0.015 | 0.014 |
| | 135 | 0.0003 | 0.0004 | 0.0008 | 0.0040 | 0.010 | 0.010 | 0.018 | 0.018 |
| | 180 | 0.0003 | 0.0003 | 0.0005 | 0.0040 | 0.030 | 0.007 | 0.015 | 0.023 |
| ε | 24 | 2.1 | 2.0 | 2.0 | 2.0 | 2.4 | 2.3 | 2.3 | 2.3 |
| | 65 | 2.1 | 2.1 | 2.1 | 2.1 | 2.5 | 2.4 | 2.3 | 2.3 |
| | 100 | 2.0 | 2.0 | 2.0 | 2.0 | 2.5 | 2.4 | 2.3 | 2.3 |
| | 135 | 2.0 | 2.0 | 2.0 | 2.0 | 2.6 | 2.5 | 2.4 | 2.3 |
| | 180 | 2.0 | 2.0 | 2.0 | 2.0 | 2.6 | 2.6 | 2.5 | 2.4 |

Test 3

An adhesive was made by mixing the resin [C-1], silane coupling agent and curing agent.

Polyester film and coppy foil having 35μ thickness were pasted by the adhesive and the laminate was cured. The obtained laminate was tested at a point of adhesive property and the results were listed in Table 4 with other aditives and curing condition. As shown in the table the resin in the invention is superior to the

EXAMPLE 6

830 parts of hydrogenized polybutadienediol [B-1] obtained in Example 1 and 144 parts of 2-hydroxypropylmethacrylate were mixed at 40° C and than 175 parts of commercial grade toluylene-diisocyanate was added dropwise and the mixture was maintained at 40° C for 1 hour further at 70° C for 2 hours and at 70° C for 3 hours and 1149 parts of the resin [D-6] being transparence, slightly yellow viscous liquid was obtained. The resin had no isocyanate group and gave fine thermosetting resin.

EXAMPLE 7

160 parts of polybutadienediol [A-1], 700 parts of hydrogenized polybutadienediol [B-1] in example 1 and 380 parts polypropyleneglycolmonomethacrylate were mixed well and then 175 parts of commercial grade of toluylenediisocyanate was added dropwise and further the mixture was maintained at 40° C for 1 hour further more at 70° C for 5 hours. 1315 parts of the resin [D-7]]being transparence, slightly yellow viscous liuid was obtained.

polybutadienediol having a number average weight of 3,980, 89.3% of 1,2-configuration 10.7% of trance-1,4-configuration and a viscosity of 36,000 centipoise at 45° C, which was prepared by addition of butadiene in tetrahydrofuran containing dispersed metallic sodium and 1,2-diphenyl benzene at −75° C and hydrolysis, were mixed and the mixture was used for the formation as shown in Test 1. The obtain resin had a similar fine properties to Table 1.

TEST 4

Test 1 was repeated except that the resins [D-1, 6, 7, 8] were used in stead of the resins [D-1, 2, 3, 4, 5]. The result is shown in Table 5.

Table 5

| Run | | 8 | 9 | 10 | 11 | 12 |
|---|---|---|---|---|---|---|
| resins | resins | D-6 | D-7 | D-8 | D-1, D'-1 | D-1, A-5 |
| (parts) composition | vinyl monomer | 100 — | 80 — | 100 styrene 20 | 80, 20 — | 80, 20 — |
| | curing agent | percumyl D 5.0 | percumyl D 3.0 | B.P.O. 10* perhexa 2.5B 3.0 perbutyl Z 2.0 | percumyl D 3.0 perbutyl Z 2.0 | percumyl D 3.0 B.P.O. 2.0 |
| curing condition | | 90° C × 1 hr + 100° C × 1 hr. + 110° C × 1 hr. + 115° C × 3 hr. + 120° C × 1 hr. | | | | |
| hardness (shore D) | | 32 | 27 | 35 | 40 | 35 |
| volume contraction (%) | | 2.7 | 1.9 | 3.2 | 3.7 | 3.5 |
| thermal resistance 180° C × 100 hrs. | shore D ϕ32mm washer test | 35 o | 31 o | 38 o | 42 o | 39 o |
| temperature rising (150° C) | | 1 | 0 | 10 | 5 | 5 |

Note
* B.P.O. — benzoylperoxide perhexa 2.5B — 2.5-dimethyl-2,5-(test-butylperoxide)hexane

EXAMPLE 8

Butadiene and styrene were added into tetrahydrofuran containing a dispersed metalic sodium and 1,2-diphenyl benzene at −75° C, and polymerized under vigorous agitation. The reaction mixture was treated with ethylene oxide and then hydrolyzed, and thus polybutadienedial [A-5] being butadiene-styrene random polymer having a number average weight 2,100, hydroxyl value of 43.6, butadiene configuration 75.8% styrene configuration 24,2%, 75.8% of 1,2-configuration 26.2% of trance-1,4-configuration, cis-1,2-configuration was obtained.

1,000 parts of polybutadiene [A-5] was dissolved 2000 parts of tetrahydrofuran and hydrogenized at 150° C and 50kg/cm² of hydrogen pressure at the presence of 5 parts of nickel catalyst and 10 parts of 2,6-di-t-butylhydroxytoluene for 3 hours according to example 1. Obtained hydrogenized polybutadiene [B-5] having 157 of iodine number, 67.7 of hydroxyl value was obtained.

Then, 2620 parts of the hydrogenized polybutadiene [B-5] and 570 parts of isocyanate compound [C-3] were reacted at 80° C for 4 hours under agitation and 3,190 parts of resin D-8 was obtained.

EXAMPLE 9

80 parts of the resin [D-1] obtained in example 1 and 20 parts of polybutadiene resin [D'-1] were mixed and the mixture was used for formation of a composition as shown in Test 1 and the thermosetting resin obtained by the composition had fine properties.

EXAMPLE 10

80 parts of hydrogenized polybutadienediol [D-1] obtained in example 1 and 20 parts of

TEST 5

200 parts of the resin [D-3] obtained in example 3 was heated at 60° C and 6 parts of γ-methacryloxy-propyltrimethoxysilane, 5 parts of di-tert-butylperoxide, 2 parts of 2,5-dimethyl-2,5-di(t-butyl peroxy) hexane were added and the mixture was further mixed well with 600 parts of silica powder, 200 parts of calcium carbonate powder, 10 parts of zin stearate and glass fiber. Then composition being dough was cured by heating at 170° C for 5 minutes under the pressure of 10 kg/cm² and the obtained moulding compound was used for the test and the results were shown in Table 6.

Further same treatment was repeated for the resin [D'-1] as a comparison. The results were listed in Table 6 too.

Table 6

| Run | | 13 | comparative 4 |
|---|---|---|---|
| Sesin | | D-3 | D'-1 |
| Curing condition | | 170° C × 10 kg/cm² × 5 mins | |
| | Balcole hardness | 50 | 78 |
| moulding compound | flexural strength (A) | 8.0 | 10.2 |
| | Young's modulus in flexure (B) | 600 | 1150 |
| | $\frac{A}{B}$ | 1.3 × 0⁻² | 0.89 × 10⁻² |

EXAMPLE 11

830 parts of hydrogenated polybutadienediol [D-1] obtained in example 1 were reacted with 175 parts of commercial grade toluylenediisocyanate and further 144 parts of 2-hydroxypropylmethacrylate was added, and the mixture was maintained at 40° C. for 1 hour further at 70° C for 2 hours and at 70° C for 3 hours, and 1149 parts of the resin being transparence, slightly yellow viscous liquid was obtained. The resin had no isocyanate group and gave fine thermosetting resin.

EXAMPLE 12

160 parts of polybutadienediol [A-1] and 700 parts of hydrogenized polybutadienediol [D-1] in example 1 were mixed well and than 175 parts of commercial grade of toluylenediisocyanate was added and further 380 parts of polypropyleneglycolmonomethacrylate was added and the mixture was maintained at 40° C for 1 hour furthermore at 70° C for 5 hours. 1,315 parts of the resin being transparence, slightly yellow viscous liquid was obtained and gave fine thermosetting resin.

EXAMPLE 13

288 parts of 2-hydroxypropylmethacrylate was allowed to react with 500 parts of diphenylmethane-4,4'-diisocyanate for 4 hrs. at 80° C under agitation and thereby 788 parts of isocyanate compound having an olefinic bond group was obtained.

Then, 1,656 parts of the hydrogenized polybutadienediol [B-1] obtained in example 1 was added to 788 parts of the isocyanate compound and the resulting mixture was heated at 80° C for 3 hrs. and consequently 2,444 parts of the resin which was light yellowish, viscous and oily matter was obtained.

According to the result of determinations and qualitative analyses including an infrared absorption spectrum analysis, it was believed that the resin mainly consisted of material having the following chemical formula:

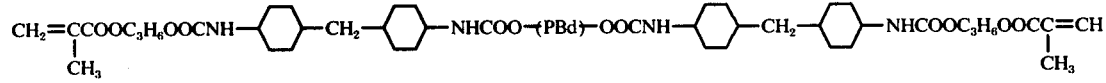

Further, the compositions containing the resin for thermosetting resin and an adhesive respectively gave satisfactory results as well as the compositions containing the resin [D-1].

EXAMPLE 14

An isocyanate compound having olefinic bond was obtained by reacting 348 parts of 2,4-toluylenediisocyanate with 144 parts of acrylic acid at room temperature for 3 hours, then 30° C for 3 hours.

Then, 2,710 parts of hydrogenized polybutadienediol [B-3] and the isocyanate compound were mixed at 80° C for 4 hours under agitation and 3,177 parts of the resin was obtained.

We claim:

1. A resin consisting essentially of a reaction product between (1) hydrogenated polybutadienediol which is prepared by hydrogentating polybutadienediol having an average molecular weight of 500 to 20,000 and 85 to 100% of 1,2-configuration, said polybutadienediol having been hydrogenated to the extent that at least 30% of the double bonds contained therein are hydrogenated and (2) an isocyanate compound obtained by the reaction of an organic diisocyanate and a hydroxyalkyl acrylate or an hydroxyalkyl methacrylate, wherein the ratio of isocyanate groups in the diisocyanate to the hydroxyalkyl acrylate or hydroxyalkyl methacrylate is from 1.1:1 to 2.5:1 and the ratio of isocyanate groups in the isocyanate compound to hydroxy groups in the polybutadienediol is from 0.5:1 to 1.2:1.

2. A mixed composition comprising the resin claimed in claim 1 to which there is added up to 70%, by weight, of a vinyl compound and 0.1 to 10% by weight of an organic peroxide.

3. A resin comprising a reaction product between (1) an isocyanate prepolymer obtained by the reaction of (a) a hydrogenated polybutadienediol, which is prepared by hydrogenating polybutadienediol having an average molecular weight of 500 to 20,000 and and 85 to 100% of 1,2-configurations, said polybutadienediol having been hydrogenated to the extent that at least 30% of the double bonds contained therein are hydrogenated, and (b) an organic diisocyanate compound wherein the ratio of isocyanate groups to hydroxyl groups is from 1.1:1 to 2.4:1 and (2) a hydroxyalkyl acrylate or an hydroxyalkyl methacrylate wherein the ratio of isocyanate groups in said prepolymer to said acrylate is from 0.5:1 to 1.2:1.

4. A mixed composition comprising the resin claimed in claim 3 to which there is added a vinyl compound in an amount of up to 70% by weight and 0.1 to 10%, by weight, of an organic peroxide.

* * * * *